United States Patent [19]
Paulis et al.

[11] Patent Number: 4,848,133
[45] Date of Patent: Jul. 18, 1989

[54] VALVING APPARATUS

[75] Inventors: George J. Paulis, Trumbull; John S. Chapkovich, III, Branford, both of Conn.

[73] Assignee: United Technologies Corporation, Hartford, Conn.

[21] Appl. No.: 132,736

[22] Filed: Dec. 14, 1987

[51] Int. Cl.$^4$ ............................................. G01M 19/00
[52] U.S. Cl. ....................................... 73/1 H; 137/558
[58] Field of Search ................... 73/1 H, 865.9, 865.8; 137/551, 552, 558, 559, 214

[56] References Cited

U.S. PATENT DOCUMENTS

| 2,330,845 | 10/1943 | Samiran | 137/558 |
| 3,640,117 | 2/1972 | Stilling | 73/1 H |
| 3,830,090 | 8/1974 | Hersch et al. | 73/1 H |

FOREIGN PATENT DOCUMENTS 46-14107   4/1971   Japan ..................................... 73/1 H Primary Examiner—Stewart J. Levy
Assistant Examiner—Robert R. Raevis

[57] ABSTRACT

A valving apparatus for selectively supplying fluid to a number of fluid handling components (45) and (50) from a plurality of sources thereof (15) and (30) includes a manifold (135), first and second remotely operated control valves (165) and a plurality of check valves (170) disposed therein. The control valves selectively channel fluid to the components while checking reverse flow through the manifold. The apparatus is compact, uncomplicated and adaptable to various applications.

8 Claims, 4 Drawing Sheets

VALVING APPARATUS

DESCRIPTION

This invention was made with Government support under a contract awarded by the Department of the Navy. The Government has certain rights in this invention.

DESCRIPTION

1. Technical Field

This invention relates generally to fluid handling systems and particularly to a valving apparatus for selectively applying fluid to multiple components of such a system for such purposes as the testing of those components.

2. Background Art

Fluid handling systems such as fuel storage systems on aircraft, often employ multiple tanks. It is common practice, in such fuel storage systems, for each tank to be provided with multiple components such as fuel level sensors which, from time to time, must be tested by selectively supplying small quantities of fuel thereto. In the fuel storage system for the CH-53 series of helicopters manufactured and sold by the Sikorsky Aircraft Division of United Technologies Corporation, four tanks are employed, each tank being provided with a pair of redundant level sensors. Standard operating procedures for such aircraft require that the level sensors be tested prior to refueling to minimize the risk of overfilling of the fuel tanks. To adequately test the level sensors of each tank, the fuel handling system must be capable of supplying each level sensor with fuel from both ground and air-to-air refueling inlets on the aircraft. Accordingly, since such a large number (eight) of level sensors must be suppliable with fuel from two sources (ground and air-to-air) thereof, that portion of the aircraft's fuel handling system which selectively channels fuel to the level sensors must include a large number of flow paths from the inlets to the various level sensors. Additionally, to isolate flow between various level sensors during the testing operation, the fuel handling system must also be capable of comprehensive valving of the fuel between the sensors. Such a large number of necessary flow paths and complex valving arrangements tend to render that portion of the fuel handling system dedicated to level sensor testing, extremely complex if such fuel channeling and valving is accomplished with individual fuel conduits and valves.

Such complexity renders this portion of the fuel handling system bulky, expensive and time consuming to manufacture, and generally unadaptable to more than a single type of aircraft. Furthermore, such a large number of individual conduits and valves necessitates a large number of joints therebetween. Inasmuch as risk of leakage in such a system can be considered to be roughly proportional to the number of joints therein, such a fuel handling system may exhibit less than optimal reliability.

DISCLOSURE OF INVENTION

Accordingly, it is a principal object of the present invention to provide an improved valving apparatus for selectively supplying fluid to multiple fluid handling components from redundant sources of that fluid.

It is another object of the present invention to provide such an apparatus which is compact and economical to manufacture.

It is another object of the present invention to provide such a valving apparatus which is uncomplicated and adaptable to use in different fluid handling systems.

It is another object of the present invention to provide such a valving apparatus of enhanced reliability due to minimization of the number of valves and distinct fluid conduits employed therein.

In accordance with the present invention, a valving apparatus for selectively applying fluid such as fuel to multiple fluid handling components such as level sensors in multiple aircraft fuel tanks, is characterized by a manifold having multiple inlet ports for connection to multiple fluid sources; multiple outlet ports, each adapted for communication with an individual level sensor; and at least two remotely operable control valves which function to direct fuel to select level sensors. Each control valve has an inlet communicating with one of the fluid sources and multiple outlets, each communicating with one of the manifold outlet ports. Each manifold outlet port and corresponding sensor is suppliable with fuel for testing from two sources of fuel for both ground and inflight testing. Each outlet port includes a check valve associated therewith, upstream thereof, to prevent fluid supplied to that port through one of the control valves, from flowing through another outlet port supplied with fluid from another one of the control valves. The control valves may be operated by solenoids and in addition to controlling the application of fuel to select outlet ports, prevent reverse flow from one of the sources through the valving apparatus, for minimizing the number of check valves and, therefore, the number of fluid passages as well as the number of connections which must be made between fluid passages in the valving apparatus. The manifold is conveniently and economically cast as a unitary structure receiving the check valves and control valves therein. Such a structure also renders the valving apparatus economical to produce, light in weight and sufficiently compact as to render the apparatus suitable for use in various applications such as in different series of aircraft.

BEST MODE FOR CARRYING OUT THE INVENTION

Figure 1:
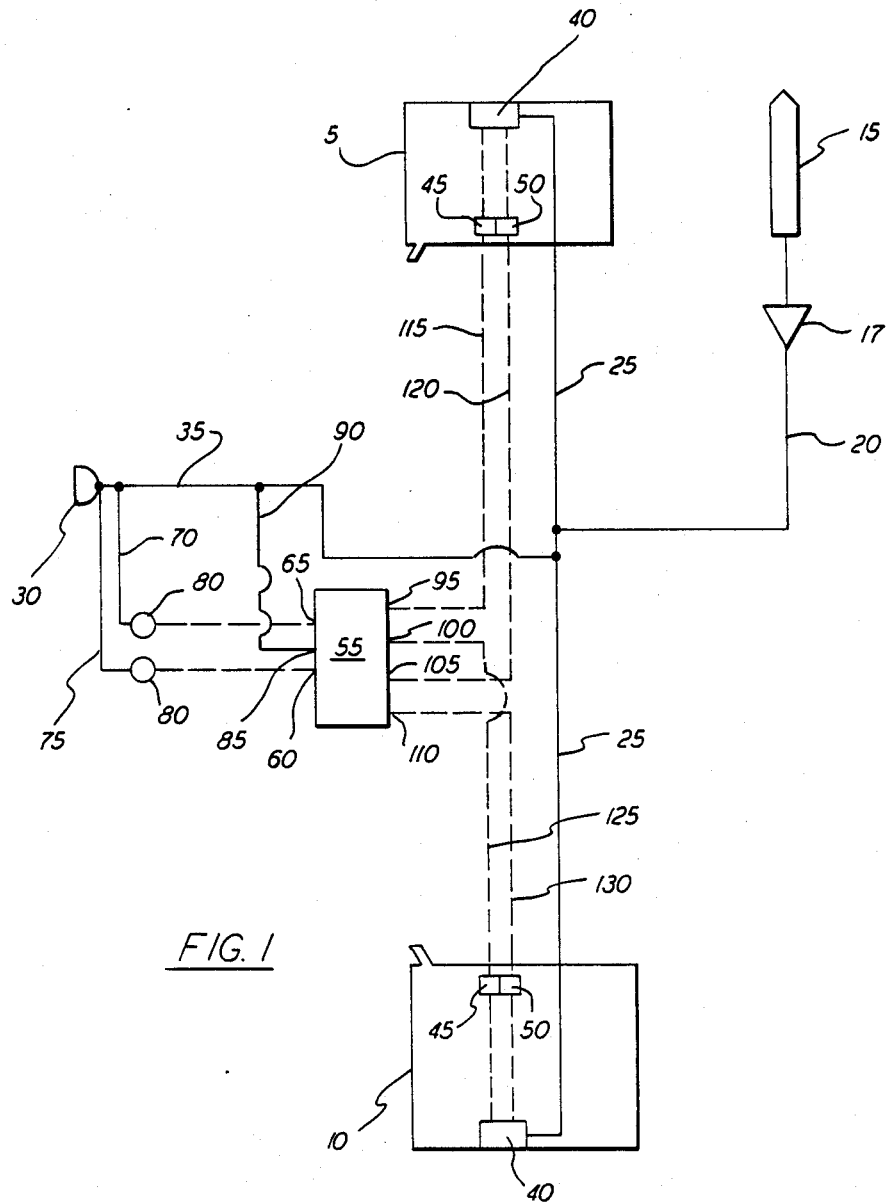
FIG. 1 is a simplified schematic representation of a multi-tank fuel handling system for an aircraft, such system employing the valving apparatus of the present invention.

Referring to FIG. 1, a fuel handling system for an aircraft such as a Sikorsky CH-53 helicopter noted hereinabove, comprises a pair of fuel tanks 5 and 10, each suppliable with fuel from both an air-to-air refueling probe 15 through check valve 17 and lines 20 and 25 as well as a ground refuel coupling 30, through lines 35 and 25. Each tank is provided with a fuel/defuel valve 40 for controlling the admission of fuel into, and the draining of fuel from the tanks. Each tank also includes a pair of redundant level sensors 45 and 50 which sense the level of fuel in the tanks to prevent overfilling thereof.

As set forth hereinabove, fuel handling systems such as the one illustrated herein, typically include means for selectively applying fuel to the various level sensors to check the operation thereof in both ground refueling and air-to-air refueling modes of operation. In accordance with the present invention, a valving apparatus 55 selectively applies fuel to the level sensors for such testing. Valving apparatus 55 includes three inlet ports, two of which (60 and 65) receive fuel from refuel coupling 30 through lines 70 and 75, each line having a manual precheck valve 80 therein. A third inlet port 85 receives fuel from air-to-air refueling probe 15 through lines 20, 35 and 90. Valving apparatus 55 also includes four outlet ports 95, 100, 105 and 110 from which fuel is provided to the level sensors through lines 115 and 120 (for the sensors in tank 5) and lines 125 and 130 (for the sensors in tank 10).

Figure 2:
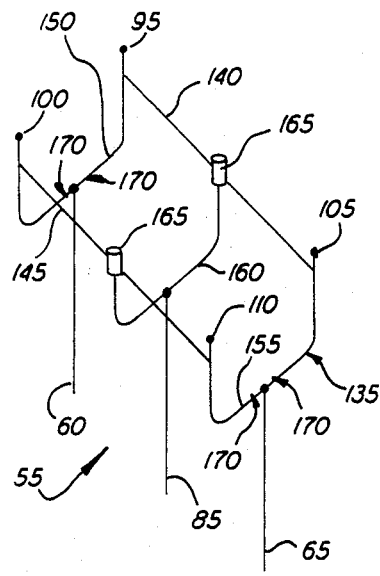
FIG. 2 is a schematic representation of the fluid passages and valves employed in the valving apparatus of the present invention.
Figure 7:
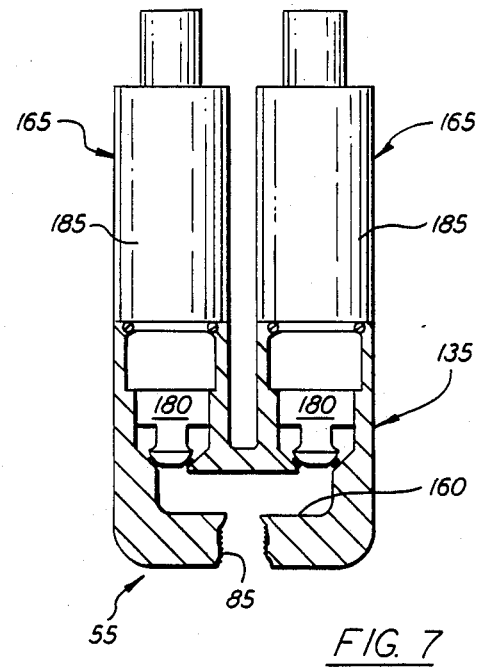
FIG. 7 is a cross-sectional view taken in the direction of line 7—7 of FIG. 4.

Referring to FIG. 2, valving apparatus 55 comprises a manifold 135 which connects the outlet ports 95 through 110 with the inlet ports 60, 65 and 85 which provide fluid thereto for ultimate use in testing the level sensors. The manifold also accommodates various valves which selectively route the fuel to select outlet ports while preventing reverse flow through the apparatus.

Referring to FIGS. 2 and 3 through 7, the manifold is essentially symmetric, comprising a pair of parallel first fluid passages 140 and 145 each of which connects the outlet ports associated with the level sensors of a single tank. The manifold also includes parallel second passages 150 and 155 each of which connects the outlet ports associated with corresponding level sensors of two different tanks. Thus, outlet ports 95 and 100 are associated with the primarily level sensors of tanks 5 and 10, respectively, while outlet ports 105 and 110 are associated with the secondary level sensors of those same two respective tanks. A single third fluid passage 160 connects the inlets of a pair of remotely operated (solenoid) control valves 165 which are supplied with fuel from inlet port 85. The outlets of the control valves are located within and connected to passages 140 and 145 whereby when opened, each of the control valves will channel fuel to both redundant level sensors within a single tank. Each of the outlet ports, just upstream therefrom, is provided with an associated check valve 170 which prevents fluid supplied to an outlet port from inlet 85 and one of control valves 165, from reverse flowing back into the manifold and out an adjacent outlet port corresponding to a different tank or out one of inlet ports 60 or 65.

Figure 3:
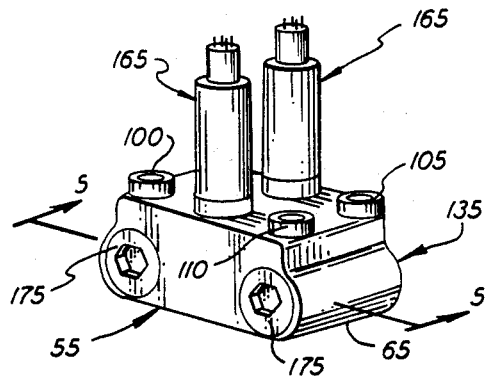
FIG. 3 is an isometric view of the valving apparatus of the present invention.
Figure 4:
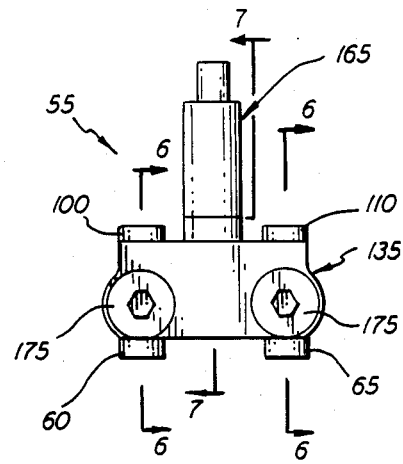
FIG. 4 is a side elevation of the valving apparatus.
Figure 5:
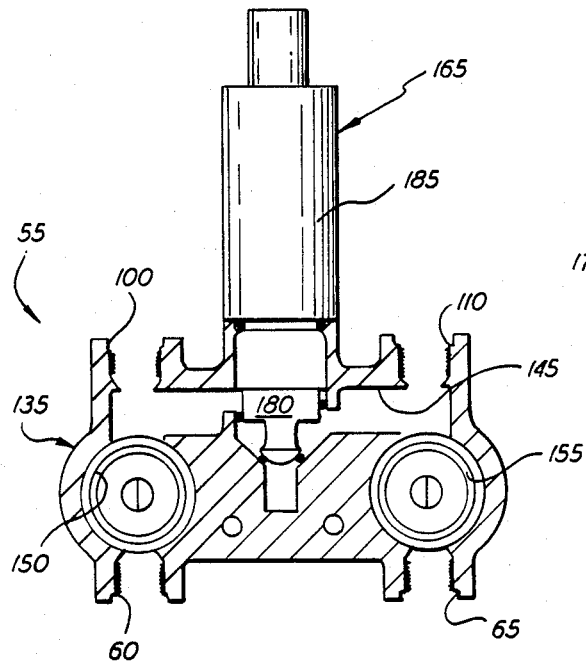
FIG. 5 is a cross-sectional view taken in the direction of 5—5 of FIG. 2.
Figure 6:
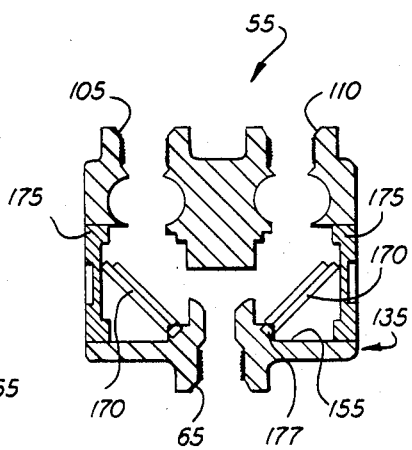
FIG. 6 is a cross-sectional view taken in the direction of either of lines 6—6 in FIG. 4.

Referring to FIGS. 8 through 12, the manifold essentially comprises a unitary structure formed by casting or the like, with passages 140 through 160 formed therein as by casting, machining or the like. As shown in FIGS. 3 and 6, passages 150 and 155 may be formed completely through the manifold and sealed as by plugs 175 after the check valves 170 are mounted within those passages. As shown in FIG. 6, the check valves comprise disc-shaped valve elements biased toward a vertical position by springs (not shown) which may, for example, coil around the pivot mount 177 of the element to the manifold. Like the flow passages 140—the various inlet and outlet ports are cast or machined into the manifold structure for communication with the various other passages and are typically screw threaded to accommodate standard aircraft fuel line fittings (not shown). As further seen in FIGS. 5 and 7, remotely operated control valves 165 include a simple poppet type valve element 180 operated by a solenoid 185. The solenoid and poppet valve are assembled to the manifold by insertion through a predrilled or precast hole therein.

Figure 8:
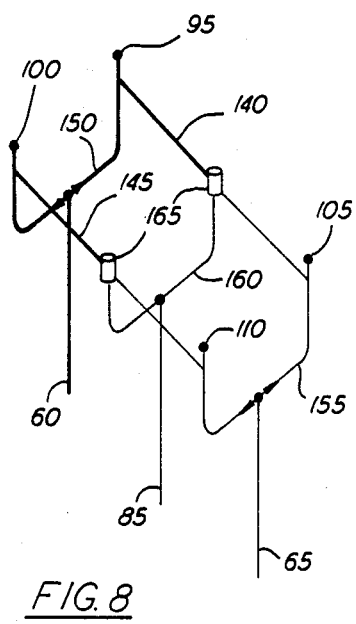
FIGS. 8 through 12 are schematic representations similar to FIG. 2, but showing the various flows through the valving apparatus during the various modes of operation thereof.
Figure 9:
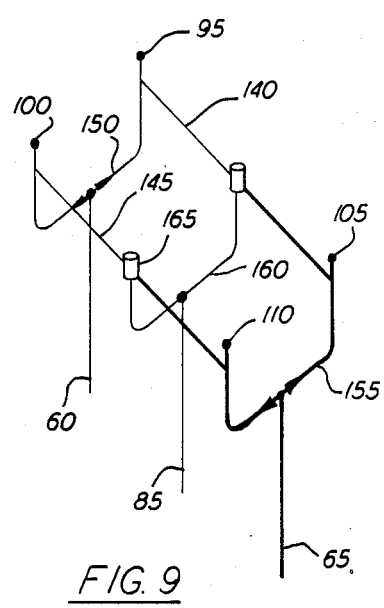

As set forth hereinabove, it is standard practice to test the fuel tank level sensors prior to both ground and air-to-air refueling. Such testing is accomplished by supplying a small amount of fuel to the level sensors and monitoring an output signal therefrom to a suitable cockpit display such as a fuel gauge, warning light or the like. To test the level sensors prior to ground precheck, manual refuel valves 80 are opened prior to refueling of the aircraft through refuel coupling 30. As illustrated in FIGS. 8 and 9, wherein the heavy lines indicate fuel in the various passages and ports, opening of either of valves 80 admits fuel to a corresponding first inlet port (60 or 65). This opens the check valves by urging the valve elements thereof outwardly against plugs 175 (FIG. 6) allowing fuel to flow into passages 150 (FIG. 3) or 155 (FIG. 4), and into either of first outlet port pairs 95 and 100 or 105 and 110, thereby supplying fuel to the associated level sensors. Note that control valves 165 block flow between second pairs of outlet ports (95 and 105 or 100 and 110), thereby functioning as check valves within the valving apparatus.

Figure 10:
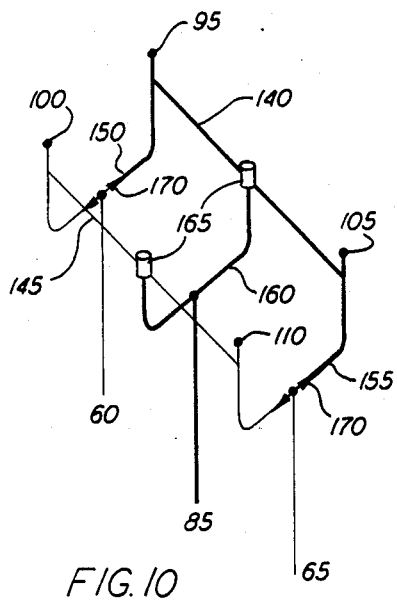
Figure 11:
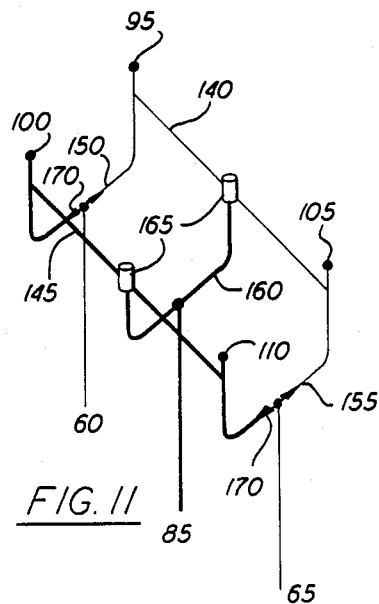

Referring to FIGS. 10 and 11, to test the level sensors prior to air-to-air refueling fuel is supplied to inlet 85 from refueling probe 15, check valve 17 and lines 20, 35 and 90. Actuation of either of the control valves 165 channels fuel through passage 160 and into an associated first passage thereby providing fuel to second pairs of outlets (95 and 105 or 100 and 110) for the testing of the level sensors associated therewith. Check valves 170 prevent reverse flow from inlet 85 through the manifold and out one inlet ports 60 or 65. Additionally, that control valve which is not energized functions as a check valve to isolate the flow to one of the second pairs of outlets from the other second pair thereof.

Figure 12:
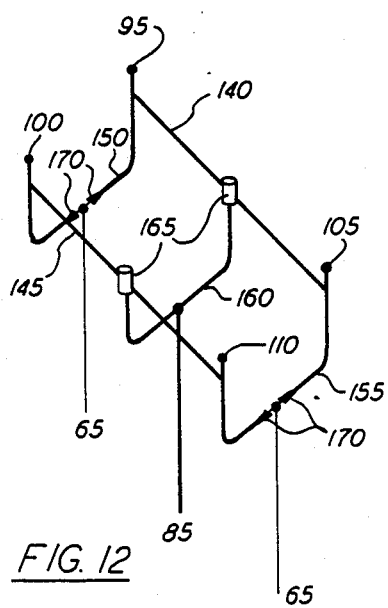

Referring to FIG. 12, should it be desirable to test all the level sensors prior to air-to-air refueling, both control valves 165 are actuated to provide fuel to all four outlets and the level sensors associated therewith, the check valves preventing reverse flow through the manifold as discussed hereinabove.

It will be appreciated that the valving apparatus of the present invention provides an effective means for selectively channeling fluid to selected pairs of outlet ports thereof (and the associated fluid handling components) for the testing thereof.

Since the control valves perform the dual function of selectively channeling fluid and checking the reverse flow thereof, the valving apparatus preforms its function with a minimum number of valves and, therefore, fluid passages. What few fluid passages are required, may be economically provided in a compact fashion within a single unitary manifold structure which may be readily adaptable to various fluid handling systems for different applications. The apparatus is also light and includes a minimum number of fluid joints thereby minimizing the risk of leakage from the apparatus.

While a particular embodiment of the present invention has been illustrated and described, it will be appreciated that various modifications may be made to the invention without departing therefrom. For example, while the invention herein has been described within the environment of a fuel handling system for an aircraft, it will be appreciated it will be useful wherever multiple fluid handling components must be tested by the application thereto of fluid from multiple sources thereof. Accordingly, it will be appreciated that various modifications may be made to the invention as herein described and it is intended by the appended claims to cover such modifications as fall within the true spirit and scope of this invention.

Having thus described the invention, what is claimed is:

1. In a fluid handling system comprising first and second tanks, each having primary and secondary fluid handling components associated therewith and being fillable from redundant sources of fluid, a valving apparatus for selectively supplying fluid from said sources to said components for the testing thereof, said valving apparatus being characterized by:
   a manifold,
   said manifold including at least one first inlet port adapted for fluid communications with one of said redundant fluid sources,
   said manifold further including a plurality of outlet ports, each outlet port comprising one outlet port of a first pair of outlet ports, as well as a second pair of outlet ports and adapted for fluid communication with one of said fluid handling components, said first pair of said outlet ports being suppliable with fluid from said at least one first inlet port;
   said manifold further including at least one, second inlet port adapted for fluid communication with the other of said fluid sources; and
   first and second remotely operable control valves, each having an inlet communicating with said second inlet port, and outlets communicating with said second pair of said outlet ports,
   whereby for testing, pairs of said fluid handling components are individually suppliable with fluid from one of said sources through said first inlet port and said first pair of outlet ports, and from another of said sources through said second inlet port and one of said control valves and said second pair of outlet ports.

2. The valving apparatus of claim 1 characterized by each of said outlet ports, at an upstream portion thereof, having a check valve associated therewith, each of said check valves preventing fluid supplied to said associated outlet port through one of said control valves from flowing through another outlet port supplied with fluid from another of said control valves.

3. The valving apparatus of claim 1 characterized by said valving apparatus including solenoids, each of which is connected to one of said remotely operable control valves for the actuation thereof.

4. The valving apparatus of claim 1 characterized by first fluid passages connecting corresponding outlet ports of multiple first pairs of said outlet ports, said remotely operable control valves being disposed in said first fluid passages for blocking fluid communication between said multiple first pairs of outlet ports and between said first and second passages, during the supply thereof with fluid from said first sources.

5. The valving apparatus of claim 4 characterized by said tanks being aircraft fuel tanks and said fluid handling components being fuel level sensors, each of said tanks being provided with a primary and a secondary fuel level sensor.

6. The valving apparatus of claim 5 characterized by the outlet ports of each first outlet port pair being adapted for fluid communication with level sensors from different tanks.

7. The valving apparatus of claim 6 characterized by the outlet ports of each second outlet port pair being adapted for fluid communication with level sensors from a single tank.

8. The valving apparatus of claim 1 characterized by said manifold comprising a generally unitary structure.

* * * * *